Aug. 28, 1962

A. F. MANZ 3,051,829

ELECTRIC ARC TORCH STARTING

Filed June 17, 1960

INVENTOR.
AUGUST F. MANZ
BY
Barnwell R. King
ATTORNEY

INVENTOR.
AUGUST F. MANZ
BY
Barnwell R. King
ATTORNEY

United States Patent Office 3,051,829
Patented Aug. 28, 1962

3,051,829
ELECTRIC ARC TORCH STARTING
August F. Manz, Newark, N.J., assignor to Union
Carbide Corporation, a corporation of New York
Filed June 17, 1960, Ser. No. 36,941
2 Claims. (Cl. 219—131)

This invention relates to electric arc torches and more particularly to initiating a pilot arc in such arc torches which, in turn, starts the main arc.

According to the invention there is provided a method of automatically starting a pilot arc of an arc torch provided with a direct current source of supply, which comprises charging an inductance in series circuit relation with the arc gap through an auxiliary circuit in parallel circuit relation with such gap, and discharging said inductance across such gap by opening said auxiliary circuit to cause an arc to jump such gap, thereby starting the flow of direct current which continues to energize the desired pilot arc in such gap.

The invention provides apparatus for starting a main arc between a main electrode and work, which comprises means for applying a main arc voltage between the end of said electrode and the work, an auxiliary electrode spaced from said main electrode, means for applying a pilot arc voltage between said main and auxiliary electrodes, said pilot arc voltage applying means comprising a source of direct current and an inductor in series circuit with said electrodes, a circuit including switching means connected in parallel circuit relation with the pilot arc gap between said electrodes, for completing a charging current circuit for said inductor by said source, and for rapidly breaking said charging circuit, thereby causing said inductor to discharge across such gap, establishing a direct current pilot arc between said electrodes energized by said source, which, in turn, is used to start the main arc between the main electrode and such work.

Prior to present invention the pilot arc of a gas shielded arc welding torch was ignited by momentarily short circuiting the pilot arc gap with a tungsten probe. Upon removal of such probe, the arc was formed. If the proper precautions were not taken, the welding electrode became contaminated with foreign material. In addition, such method was difficult or hazardous to use in many places, because of equipment location and design. Furthermore, probe starting cannot be employed to advantage for remote control operation. A desirable solution to these difficulties would rest with a control system capable of remote operation. As a consequence, such a system would eliminate the problem of electrode contamination and the hazardous conditions associated with mechanized welding.

The main object of the present invention is to provide an automatic method for initiating an arc in an arc torch. Another object is to provide means for remotely initiating a pilot arc.

The subject invention involves pilot arc initiation by an inductive voltage surge. Its principle of operation, however, lends it to any welding process which requires the breakdown of some initial arc gap. Then, with the proper equipment it should be possible and practical to extend this method to arc welding, arc cutting, spot-welding, A.C. welding, and general welding arc starting. The subject invention is of particular value in mechanized welding setups.

Specifically, the invention described herein has been found to operate with a D.C. arc power source whose basic system design includes an inductance as an inherent feature.

According to the accepted theory of voltage generation, the change in voltage across a power supply inductance is proportional to the rate of change of the current in the inductance. This relationship is expressed by the following equation:

(1) $$\Delta e = L \frac{di}{dt}$$

where:

$\Delta e$ = voltage generated across the inductance
$L$ = power supply circuit inductance
$\frac{di}{dt}$ = rate of change of current It is this principle as applied to a pilot arc power supply that, in effect, determines the performance of this invention.

Figure 1:
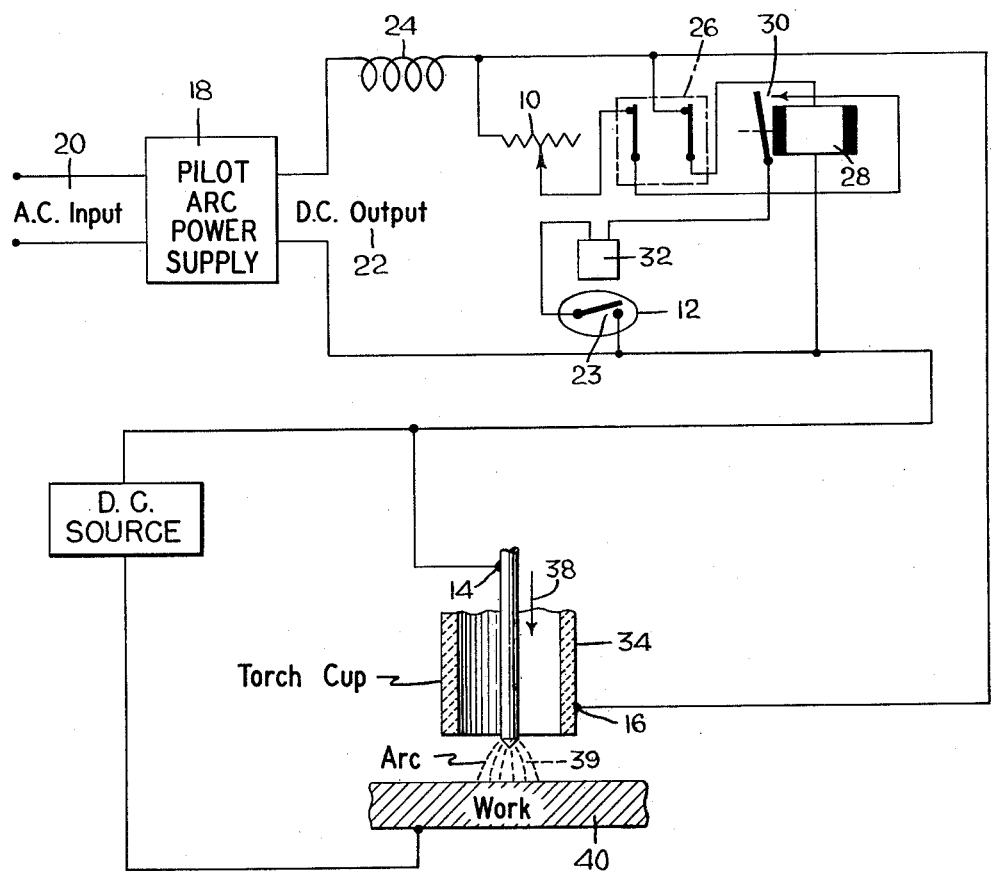
FIG. 1 is a simplified circuit diagram illustrating the invention.

With reference to FIG. 1, if a load resistance 10 and a suitable switching mechanism 12 are connected in parallel across the arc terminals 14 and 16 of a pilot arc power supply 18 having an A.C. input 20 and a D.C. output 22, the power supply can be made to draw an initial current, $I_0$, through an inductor 24 having an inductance $L$. The resistance 10 and switch 12 are connected in a circuit including a master control switch 26 and a control relay 28 having normally open contacts 30, and operating coil 32 of the switch 12. Arc terminals 14 and 16 constitute the tungsten electrode and gas cup or nozzle, respectively, of an arc torch 34 which is supplied with suitable gas 38, such as argon and/or helium, for shielding an arc 39 energized between electrode 14 and work 40.

When the switching mechanism 12 is opened by coil 32 as a result of the closure of control switch 26 and operation of relay 28, such current, $I_0$, tends to fall to zero. Simultaneously with such falling current, a high voltage pulse is generated by and across inductance $L$ in accordance with Equation 1, because a large $di/dt$ is created by the rapid opening of the load resistance circuit. Such rate of change of current is sufficiently great, and the gap between contacts 23 of switch 12 is effectively larger than the distance between the torch electrode 14 and cup 16 such that the voltage, $\Delta e$, generates an arc-over in the gap therebetween.

The inductance of the circuit interrupted provides a voltage sufficient to develop an "inductive-kick" arc across the switching mechanism 12. The switch discharge is an arc, not a spark. The voltage which creates such discharge is used to cause the breakdown of the arc gap placed in parallel with the switching mechanism. As a result, such breakdown takes place between the pilot arc terminals 14 and 16 instead of between the switch contacts 23. It is because of this phenomenon that the subject invention functions.

The voltage pulse is generated in such a direction as to create an inductive-discharge arc-over between the arc terminals 14 and 16. The pilot arc direct current then follows as a normal course of events. As soon as such D.C. pilot arc is established, relay 28 deenergizes, opening contacts 30, thereby resetting the circuit for restriking the arc automatically in the event the D.C. pilot becomes extinguished.

When applying the following singularly or in combination, the interrupting properties of the switching device 12 can be improved by: (1) lengthening the arc column; (2) gas blasts; (3) high gas pressure or vacuum; (4) fluid action; and (5) surface deionization. As a case in point, a compressed air stream was directed at the exposed points of a spring loaded switch. When the switch was operated the air blast came into contact with the exposed points and extinguished the arc at the switch. Consequently, a large $di/dt$ was created.

In actual practice a pilot arc was started repeatedly in an HW-8 (Linde) torch using a ⅛ inch tungsten electrode, argon shielding gas, and a No. 10 (Linde) cup. The arc-over was created with an HWC-1, described in United States Patent 2,922,871 and Uunited States patent application Serial No. 2,738 (Linde), pilot arc power supply, using a compressed air blast to aid the interruption properties of the switching device. Another type switching mechanism, namely a vacuum switch, was also used to start the pilot arc. Such examples generated a pulse of at least 4000 volts. The same concept was adapted for use in establishing pilot arcs in atmospheres of hydrogen, and argon-hydrogen mixtures.

Since any electrical element in the circuit is subject to high voltage stress, proper electrical insulation is required. As an example, the large potential developed in the winding layers of the inductance 24 can cause internal arc-over and thus prevent an arc-over at the gap. To combat such an undesirable condition, adequate insulation for the inductor should be provided.

Figure 2:
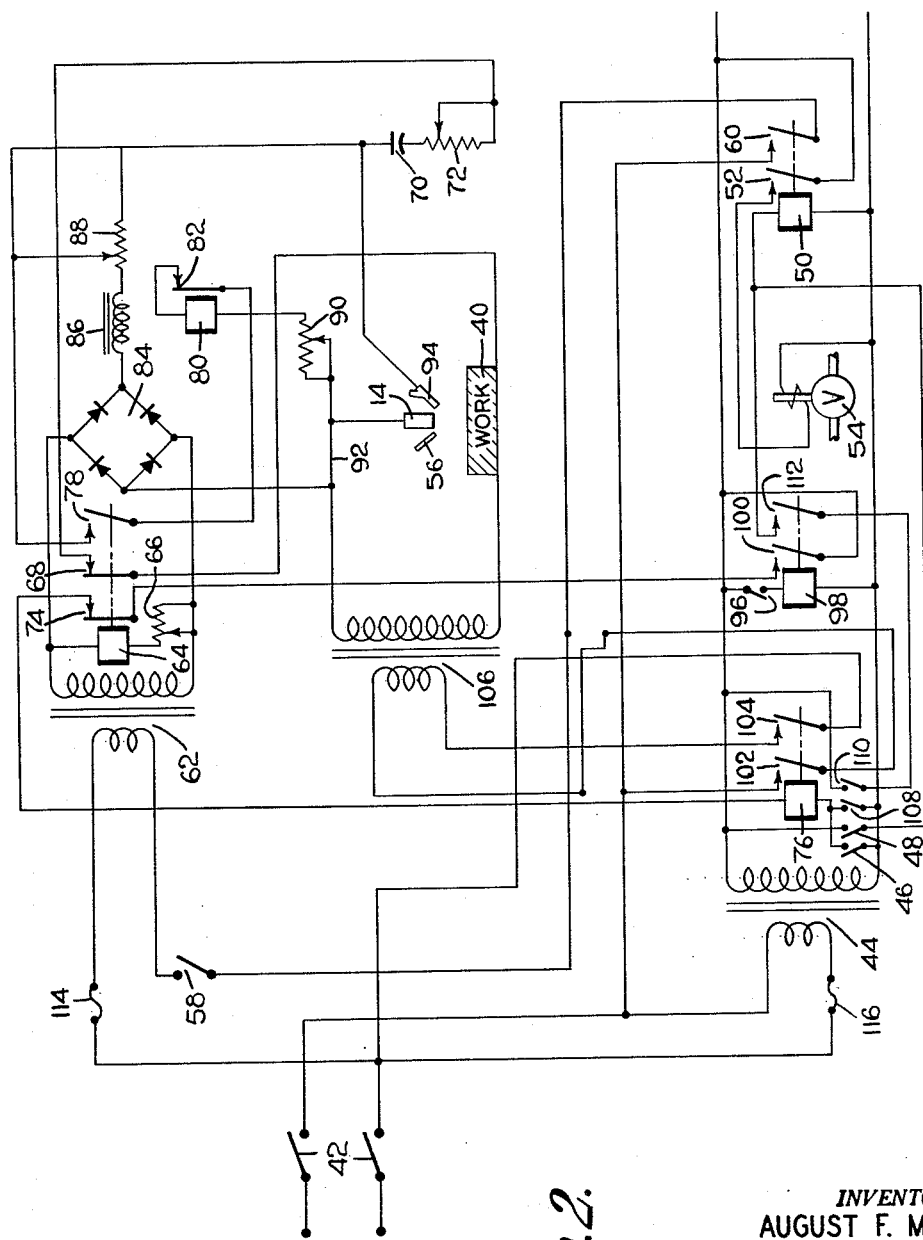
FIG. 2 is a circuit diagram of an automatic system of the invention.

However, as an alternative to costly insulation for the other external circuit elements, a system of relays may be used to remove such electrical devices prior to pilot arc ignition. Once the pilot arc is established, the external circuit elements are replaced in the circuit. This permits the use of the invention with circuit elements (meters, sensing relays, etc.) necessary for welding applications. For example, as shown in FIG. 2, when main line switch 42 is closed, control transformer 44 is energized. This provides control circuit power. When normally open double-pole single-throw pilot arc start switch contacts 46 and 48 are closed, time delay relay 50 is energized, thereby instantaneously closing normally open time delay relay contacts 52. Thus, normally closed argon shut-off valve 54 is opened, permitting argon to flow in the welding torch 56, causing normally open flow switch contacts 58 to close. After a small time delay, normally open time delay contacts 60 close, energizing the pilot arc transformer 62 which causes voltage relay 64 to operate, because of the open circuit voltage appearing across the secondary winding of transformer 62. Adjustable resistor 66 is used to adjust the operating point of voltage relay 64.

The operation of voltage relay 64 causes normally closed voltage relay contacts 68 to open and remove condenser 70 and adjustable resistor 72 from the circuit. At the same time, normally closed voltage relay contacts 74 open and prevent the welding contactor 76 from energizing. Simultaneously, normally open voltage relay contacts 78 close and complete the circuit of vacuum switch operating solenoid 80 through the normally closed vacuum switch contacts 82. Current now flows through the series circuit comprising full-wave single phase bridge rectifier 84, filter choke 86, current limiting resistor 88, closed voltage relay contacts 78, closed vacuum switch contacts 82, and vacuum switch solenoid 80, through adjustable resistor 90 which controls the current of the vacuum switch circuit. The circuit is completed through welding lead 92, back to the rectifier 84.

As current is drawn through such series circuit, a magnetic field is produced in the filter choke 86. When the current through the vacuum switch operating solenoid 80 reaches a predetermined value, normally closed vacuum switch contacts 82 are opened, creating an inductive voltage pulse which appears between pilot arc auxiliary-electrode 94 and the main welding electrode 14 of torch 56. This voltage pulse initiates breakdown of the pilot arc gap between electrodes 94 and 14, causing a high-pressure D.C. electric arc to be formed between the said electrodes, energized by rectifier 84.

Upon the establishment of such high-pressure D.C. pilot arc, hereafter referred to as the pilot arc, the voltage across the secondary of the transformer 62 decreases, due to its inherent regulation characteristics, causing voltage relay 64 to deenergize. This causes voltage relay contacts 78 to open and effectively remove elements 80, 82 and 92 from the circuit. Simultaneously, normally closed voltage relay contacts 68 reclose and place condenser 70 and adjustable resistor 72 back in the circuit. Also, normally closed voltage relay contacts 74 reclose. Resistor 88 is used to adjust the steady state current of the pilot arc.

The function of condenser 70 and adjustable resistor 72 is described in R. P. Sullivan's copending application Serial No. 801,787, now Patent No. 2,993,984. With the pilot arc operating, it is now possible to complete the welding sequence by bringing the main electrode 14 into welding circuit relation with workpiece 40 and closing normally opened foot switch contacts 96. This energizes foot switch relay 98 causing normally open foot switch relay contacts 100 to close and energize the welding contactor 76. As a result, welding contactor contacts 102 and 104 are closed, energizing the main welding transformer 106. The open circuit voltage of the main welding transformer 106 applied across the gap of the welding electrode 14 and workpiece 40, causes a high pressure A.C. welding arc to be established across said gap conducted by the ionized gas path provided by the pilot arc, in conjunction with the thermionic state of the main welding electrode 14. Said high-pressure A.C. welding arc is hereafter referred to as the main welding arc.

If the pilot arc should fail, which ordinarily would not be experienced during the welding operation, the following sequence of events takes place automatically to avoid continued welding with severe rectification. The secondary voltage of transformer 62 rises, because of its inherent regulation characteristics, causing voltage relay 64 to be re-energized. This causes normally closed voltage relay contacts 74 to reopen and de-energize welding contactor 76, thereby removing primary power to transformer 106, causing the main welding arc to extinguish. Simultaneously, normally closed voltage relay contacts 68 are reopened and condenser 70 and resistor 72 are removed from the circuit. Also normally open voltage relay contacts 78 reclose and re-initiate the sequence of events described previously, thereby recreating a high voltage pulse and re-establishing the pilot arc.

A repetitive voltage pulse is automatically produced until the pilot arc is ignited or the entire circuit is disconnected by opening of main line switch 42 or opening of pilot arc start switch contacts 46 and 48. This repetitive pulsing is caused by self-interruption of the vacuum switch operating solenoid 80 by its normally closed contacts 82, this operation being similar to an ordinary self-interrupting door bell. The purpose of providing normally closed contacts 68 of voltage relay 64 in series with condenser 70 and variable resistor 72 is to eliminate a parallel path for the high voltage starting pulse through work 40 and the secondary of the welding transformer 106 and further to protect condenser 70 from said high voltage pulse.

If foot switch contacts 96 are opened, the foot switch relay 98 is de-energized, causing normally open foot switch relay contacts 100 to open and de-energize welding contactor 76, thereby opening welding contactor contacts 102 and 104, de-energizing main welding transformer 106 and extinguishing the main welding arc. Alternatively, if pilot arc start switch contacts 46 and 48 are reopened, time delay relay 50 is de-energized, causing normally open time delay relay contacts 60 to reopen instantaneously and de-energize the pilot arc circuit. Also, the circuit of the welding contactor 70 is de-energized by opening the pilot arc start switch contacts 46. This opens normally open welding contactor contacts 102 and 104, thereby de-energizing welding transformer 106 and extinguishing the main welding arc.

A short time later normally open time delay relay contacts 52 reopen as a result of the delayed timing action of the time delay relay 50, causing the argon shut-off valve 54 to de-energize, shutting off the argon flow. This is done to provide an inert gas shield for the main welding electrode and pilot arc electrodes 14 and 94, respectively, during their cooling-off period to prevent the formation of oxides which would occur if they cooled under normal atmospheric conditions.

For automatic operation, automatic start switch contacts 108 and 110 are closed; then, upon energizing the foot switch 96, contacts 112 of the foot switch relay 98 are closed. This causes the sequence of events enumerated previously to be repeated. Fuses 114 and 116 are circuit protecting elements.

What is claimed is:

1. In gas shielded arc welding apparatus comprising a torch including a gas cup, an electrode associated therewith, and means for discharging arc shielding gas through said cup around the end of said electrode, and an arc welding circuit including such end of said electrode; means for energizing a direct current pilot arc between said electrode and an auxiliary electrode associated with said cup, comprising a direct current pilot arc power supply circuit connected to said electrodes, which includes an inductor in series relation therewith, a switch connected in parallel circuit relation with said electrodes, said switch, when closed, establishing a charging circuit for said inductor, the opening of which causes said inductor to discharge across the gap between said electrodes, thereby establishing the direct current pilot arc therebetween, in combination with relay means for automatically operating said switch until the pilot arc is established.

2. In gas shielded arc welding apparatus as defined by claim 1, means for automatically operating said relay means in the event such pilot arc becomes extinguished for the purpose of restarting such pilot arc.

References Cited in the file of this patent

UNITED STATES PATENTS

| | | |
|---|---|---|
| 1,591,112 | Buttolph | July 6, 1926 |
| 1,895,361 | Zecher et al. | Jan. 24, 1933 |
| 2,892,072 | Miller | June 23, 1959 |
| 2,922,871 | Hackman et al. | Jan. 20, 1960 |